(12) United States Patent
Jayaram et al.

(10) Patent No.: US 8,079,717 B2
(45) Date of Patent: Dec. 20, 2011

(54) SYSTEM AND METHOD FOR AUTOMATED PROJECTOR LAMP MANAGEMENT

(75) Inventors: Subramanian Jayaram, Austin, TX (US); Jeffrey S. Layton, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 924 days.

(21) Appl. No.: 12/099,975

(22) Filed: Apr. 9, 2008

(65) Prior Publication Data

US 2008/0189193 A1    Aug. 7, 2008

Related U.S. Application Data

(63) Continuation of application No. 11/114,968, filed on Apr. 26, 2005, now Pat. No. 7,377,658.

(51) Int. Cl.
*G03B 21/20* (2006.01)
*H05B 37/02* (2006.01)
*H05B 37/04* (2006.01)
*H05B 41/46* (2006.01)
*B60Q 1/124* (2006.01)
*G06F 15/16* (2006.01)
*G06F 15/173* (2006.01)

(52) U.S. Cl. .......... 353/85; 353/121; 353/122; 315/159; 315/134; 315/307; 314/1; 362/458; 362/802; 709/250; 709/223

(58) Field of Classification Search .............. 353/121, 353/85, 122; 315/159, 134, 307; 314/1; 362/458, 802; 345/30; 709/250, 223
See application file for complete search history.

(56) References Cited

U.S. PATENT DOCUMENTS

| | | | |
|---|---|---|---|
| 4,142,129 A | 2/1979 | Engstrom | |
| 2003/0191836 A1* | 10/2003 | Murtha et al. | 709/224 |
| 2005/0024219 A1* | 2/2005 | Childers | 340/641 |

* cited by examiner

*Primary Examiner* — Georgia Y Epps
*Assistant Examiner* — Magda Cruz
(74) *Attorney, Agent, or Firm* — Hamilton & Terrile, LLP; Robert W. Holland

(57) ABSTRACT

An information handling system projector tracks lamp usage to generate a lamp order form for order of a replacement lamp when lamp usage is a predetermined usage. The lamp order form is automatically generated and displayed to include lamp usage and projector identification information so that a user need not manually input that information into an order form. A network module of the projector supports queries for lamp usage from a lamp management module running on an information handling system. A projector processor interfaced with the network module reads the lamp usage and projector identification information from firmware of the projector and provides the lamp usage and projector identification information to the lamp management module for automatic generation of the lamp order form display.

12 Claims, 2 Drawing Sheets

SYSTEM AND METHOD FOR AUTOMATED PROJECTOR LAMP MANAGEMENT

This application is a continuation of application Ser. No. 11/114,968, filed Apr. 26, 2005 now U.S. Pat. No. 7,377,658, entitled "System and Method for Automated Projector Lamp Management" and naming Subramanian Jayaram and Jeffrey S. Layton as inventors, which is hereby incorporated by reference in its entirety.

BACKGROUND OF THE INVENTION

1. Field of the Invention

The present invention relates in general to the field of information handling system projectors, and more particularly to a system and method for automated projector lamp management.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often interact with a number of peripherals to communicate, print, display or otherwise process information. For instance, information handling systems are often interfaced with projectors that project images generated by the information handling system with a powerful lamp. A typical projector accepts image information from an information handling system to generate an image with a scalar chip and display the image on a liquid crystal display. A halogen or other arc lamp illuminates the image through a lens that focuses the image on a screen. The lamp illumination is typically quite bright to ensure that the image has sufficient brightness for viewing. The information handling system interfaces with the projector through any of a number of cables, such as USB, VGA or DVI cables. Some projectors include networking capability, such as an RJ-45 connector or a wireless local area network (WLAN) card so that information for display by the projector can be communicated through a network. High quality images are available from projectors as long as the lamp provides adequate illumination for the lighting conditions in which the projector is operating.

One difficulty with projectors is that the lamps used in projectors tend to gradually dim in their maximum available brightness over time due to changes in the arc of the lamp. Generally, after a certain number of hours of usage of a lamp, the projector displays a message that the lamp has reached the end of its life and needs replacement. Replacement lamps are typically expensive and are generally specific to the model of the projector. Often replacement lamps are ordered through the Internet for delivery to the projector location. However, to place an order the purchaser typically must have information on the projector model number, the part number and the hours of usage. Collecting this information often causes delays in ordering of replacement lamps, especially where an information technology administrator has to locate the projector to gather the information. Excessive delays in ordering a replacement lamp can result in failure of the projector lamp before the replacement lamp arrives.

SUMMARY OF THE INVENTION

Therefore a need has arisen for a system and method which simplifies the ordering of replacement lamps for an information handling system projector.

In accordance with the present invention, a system and method are provided which substantially reduce the disadvantages and problems associated with previous methods and systems for managing replacement lamp ordering for information handling system projectors. Lamp usage is periodically compared with lamp life to initiate an order for a replacement lamp. Lamp and projector information is automatically collected to generate a lamp order populated with the replacement order information. The lamp order is presented to a user with specifications for the replacement lamp completed.

More specifically, a lamp management module periodically queries a projector processor to retrieve lamp usage and projector identification information from firmware of the projector for displaying an order form when a replacement lamp order is needed. The lamp management module applies the lamp usage and projector identification information against a predetermined lamp usage to determine if a replacement order is needed. If a replacement order is needed, a lamp order module generates an order form having the lamp usage and projector identification information populated and displays the order form to a user to approve placement of the order. The lamp management module communicates with the projector processor through a network module to obtain the lamp usage and projector identification information. In addition, the lamp management module communicates the order form through the network for display at the projector.

The present invention provides a number of important technical advantages. One example of an important technical advantage is that the information needed to place an order for a replacement lamp for an information handling system projector is automatically gathered and presented to a user with the notice that a replacement lamp is needed. The automatically generated information is used to fill in an order form sent over the Internet to a replacement lamp ordering source. Communication from the projector through a network to a centralized management site of the lamp replacement notice and lamp replacement information simplifies replacement lamp management for information technology administrators. Alternatively, automated display of the order form with the lamp usage and projector identification information at the projector or an information handling system interfaced with the projector simplifies the replacement lamp ordering for individual projectors.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Automated generation and display of a replacement lamp order form for an information handling system projector simplifies replacement lamp ordering. An information handling system interfaced with the projector presents the order form as a user display that minimizes user inputs to place an order for a replacement lamp. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
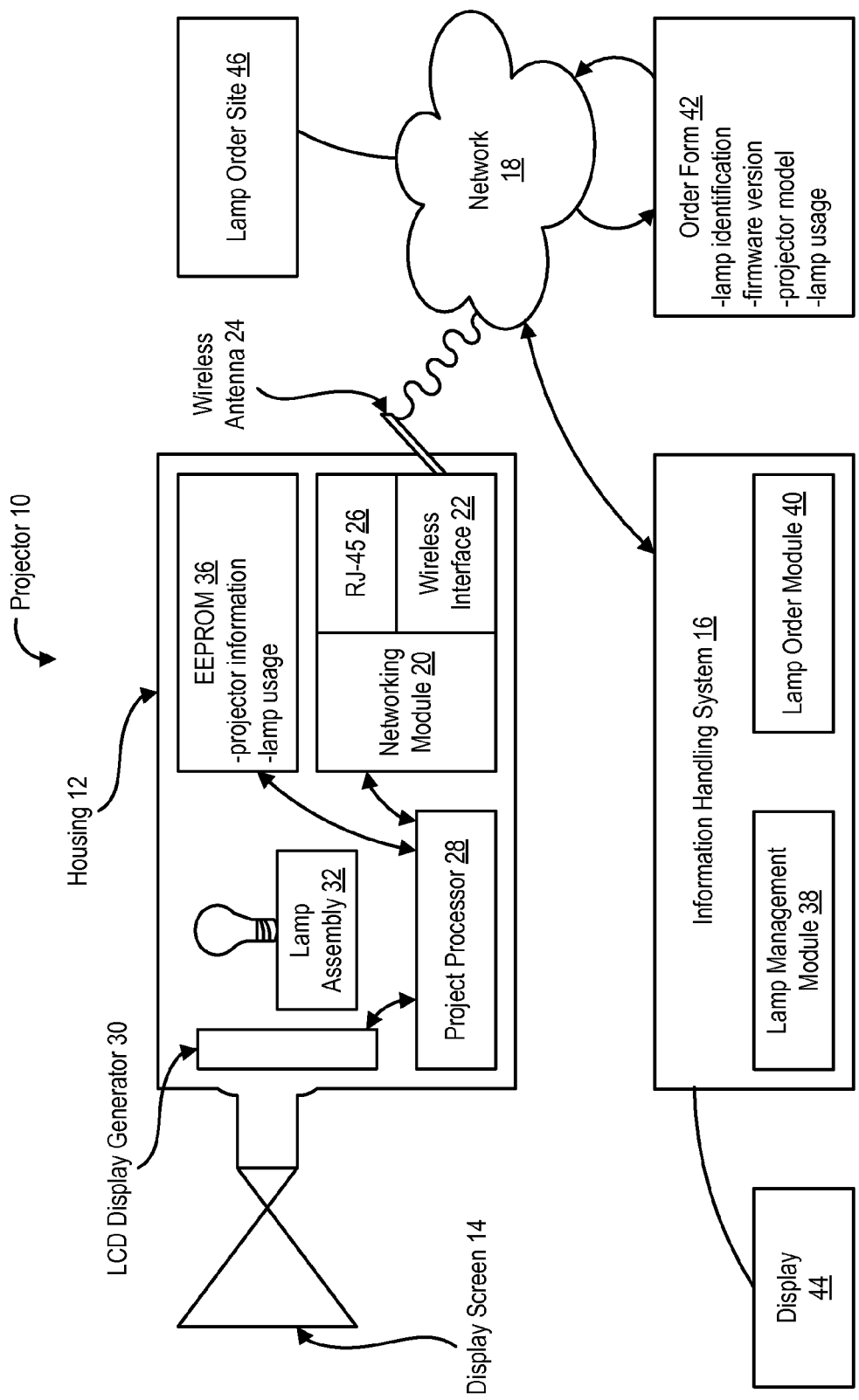
FIG. 1 depicts a block diagram of a system for automated ordering of replacement lamps for an information handling system projector.

Referring now to FIG. 1, a block diagram depicts a system for automated ordering of replacement lamps for an information handling system projector 10. Projector 10 holds components disposed in a housing 12, the components accepting display information to generate a display on a display screen 14. For instance, an information handling system 16 communicates display information through a network 18 to a network module 20 of projector 10. Network module 20 includes a wireless interface 22 having a wireless antenna 24 that communicates over a wireless local area network. Alternatively, network module 20 supports a wired network interface, such as a RJ-45 network jack. The display information is communicated from network module 20 to a projector processor 28, such as a scalar processor, which formats the display information to generate an image on a LCD display generator 30. A lamp assembly 32 including a lamp 34 generates light to illuminate display generator 30 and thus project the image at display screen 14. Lamp assembly 32 tracks lamp usage, such as the hours that lamp 34 is illuminated, and stores the lamp usage in firmware, such as EEPROM 36. In addition, EEPROM 36 stores projector information, such as the projector model number, the firmware version loaded on the projector, the lamp type used by the projector and a unique identification code for the projector.

In order to track usage of lamp 34 and order replacement lamps in a timely manner, a lamp management module 38 periodically monitors lamp usage and compares the usage with a lamp end-of-life usage parameter to determine an appropriate time to order a replacement lamp. Lamp management module 38 is a software utility operating on an information handling system 16 interfaced with projector 10 or, alternatively, may be included as firmware instructions to operate on projector processor 28. Lamp management module 38 periodically sends a query through network 18 to network module 20 to request the current lamp usage. Network module 20 communicates the request to projector processor 28, which retrieves the lamp usage and projector identification information from EEPROM 36, such as through an $I^2C$ bus of projector 10. Network module 20 receives the lamp usage and projector identification information from projector processor 28 and replies with the queried information to lamp management module 38. Lamp management module 38 compares the returned usage with end-of-life usage parameters for the lamp associated with the projector identification information to determine if a replacement lamp should be ordered.

If the lamp usage retrieved from projector 10 indicates the end-of-life for the lamp, a lamp order module 40 prepares an order form 42 for initiating a replacement lamp order. Lamp order module 40 populates order form 42 with the information needed to place an order, such as the lamp identification, firmware version, projector model and lamp usage retrieved from EEPROM 36. Lamp order module 40 prepares order form 42 for display to a user, such as with a display 44 interfaced with information handling system 16 or by communicating information to display order form 42 to projector 10 for presentation on display screen 14. Order form 42 notifies the user that the lamp has approached end-of-life and includes the system information needed to place an order for a replacement lamp from a lamp order site 46, such as an Internet site. The user confirms the order by populating payment and delivery information in order form 42 and sending order form 42 to lamp order site 46 through network 18. The ordered bulb is shipped by lamp order site 46 in accordance with the delivery information. Lamp management module 38 may reside on an information handling system directly interfaced with a single projector 10 or may monitor multiple projectors from a centralized server.

Figure 2:
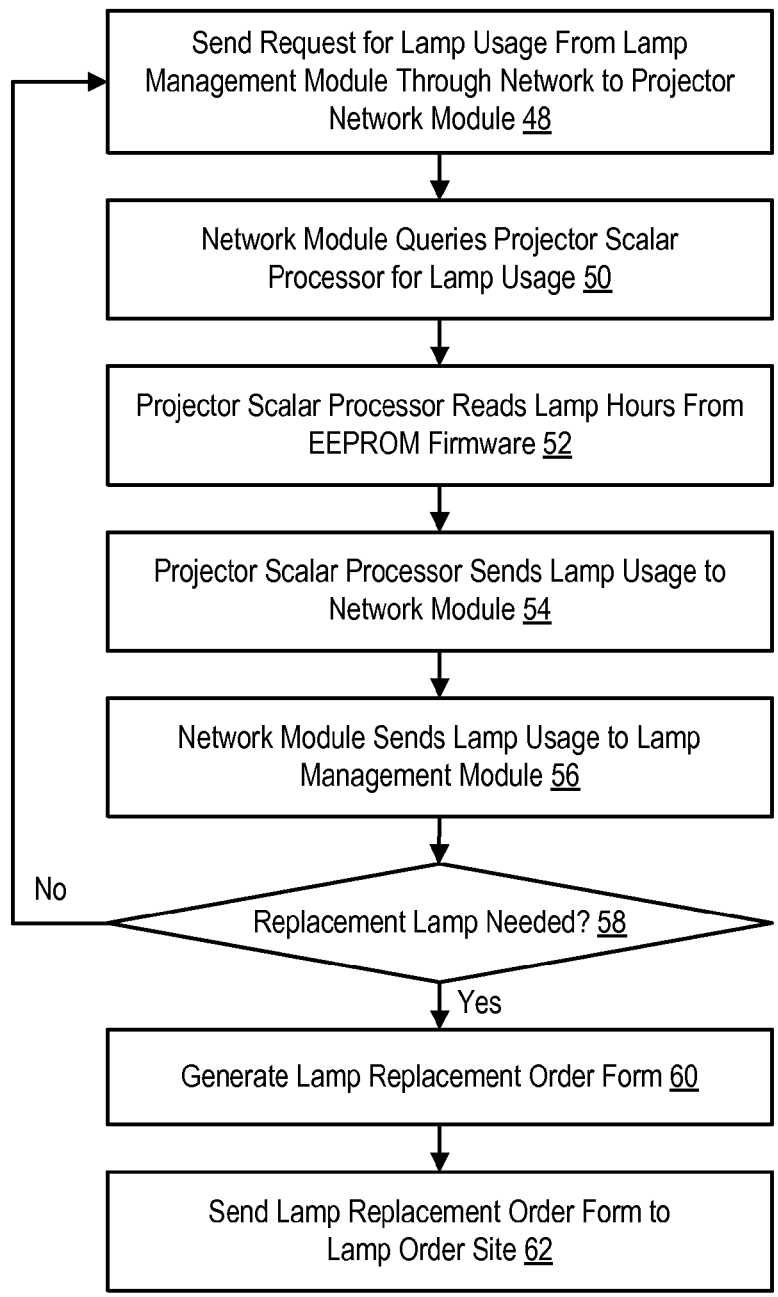
FIG. 2 depicts a flow diagram of a process for automated ordering of replacement lamps for an information handling system projector.

Referring now to FIG. 2, a flow diagram depicts a process for automated ordering of replacement lamps for an information handling system projector. The process begins at step 48 with a request periodically sent from the lamp management module through the network to the projector for the lamp usage. The request for lamp usage can be based on time periods, initiation of projector use, signals sent by the projector or other factors. At step 50, the network module queries the projector scalar processor to retrieve the lamp usage. At step 52, the projector scalar processor reads hours of lamp usage from EEPROM firmware and, at step 54, sends the lamp usage to the network module. In alternative embodiments, additional information, such as projector identification information stored in EEPROM firmware, is included with the lamp usage information. At step 56, the network module sends the lamp usage through the network to the lamp management module. At step 58, the lamp management module applies the lamp usage to determine if a replacement should be ordered. The determination can be based on a comparison of current usage to expected life or can consider other factors, such as the rate of use of the projector. If a replacement order is not needed, the process returns to step 48 for additional period queries. If a replacement order is needed, the process continues to step 60 to generate a lamp replacement order form from the lamp usage and projector identification information. The lamp replacement order form automatically includes system specifications for the replacement lamp as determined by the information received from the projector so that a user need not manually complete the part specification. At step 62, the lamp replacement order form is sent to a lamp order site, such as through the Internet, so that the replacement lamp is shipped for the projector.

Although the present invention has been described in detail, it should be understood that various changes, substitutions and alterations can be made hereto without departing from the spirit and scope of the invention as defined by the appended claims.

What is claimed is:

1. A system for managing replacement of an information handling system projector lamp, the system comprising:
   memory disposed in the projector and operable to store lamp usage information and projector identification information;
   a projector processor disposed in the projector and interfaced with the memory, the projector processor operable to retrieve the lamp usage information and projector identification information;
   a network module disposed in the projector and interfaced with the projector processor, the network module operable to communicate with a network;
   a lamp management module interfaced with the projector processor and the network module, the lamp management module operable to apply the lamp usage information and the projector identification to generate a display having a lamp order if the lamp has a predetermined usage; and
   a lamp order module running on the information handling system and operable to place an order for a lamp through the network with the order form.

2. The system of claim 1 further comprising:
   a display generator disposed in the projector and interfaced with the lamp management module, the display generator operable to generate an image for display by the projector; and
   a lamp assembly disposed in the projector and operable to illuminate the image of the display generator to display the image from the projector;
   wherein the lamp management module displays the lamp order with the display generator.

3. The system of claim 2 further comprising a lamp order site interfaced with the lamp management module through the network, the lamp order site operable to accept a lamp order placed with the lamp order form through the network.

4. The system of claim 1 further comprising an information handling system interfaced with the network module, the lamp management module running on the information handling system and communicating with the projector processor through the network.

5. The system of claim 4 further comprising a display interfaced with the information handling system and operable to display the order form.

6. The system of claim 1 wherein the projector identification information comprises a lamp part number.

7. The system of claim 1 wherein the lamp management module determines a lamp part number from the projector identification information.

8. An information handling system projector comprising:
   a housing;
   a network module disposed in the housing and operable to communicate with a network;
   a projector processor disposed in the housing and interfaced with the network module, the projector processor operable to coordinate communication of display information from the network for display by the projector;
   a display generator disposed in the housing and interfaced with the projector processor, the display generator operable to generate an image from the display information;
   a lamp assembly disposed in the housing and operable to illuminate the display generator to project the image from the housing;
   firmware disposed in the housing and interfaced with the projector processor and operable to store lamp usage information; and
   a lamp management module operable to read the lamp usage information and generate a lamp order form for display if the lamp has a predetermined usage.

9. The information handling system projector of claim 8 wherein the firmware is further operable to store projector identification information and the lamp management module is further operable to read the projector identification information and generate the lamp order with the projector identification information included.

10. The information handling system projector of claim 8 wherein the lamp management module comprises firmware instructions running on the projector processor.

11. The information handling system projector of claim 8 wherein the lamp management module comprises software instructions running on an information handling system interfaced with the network module.

12. The information handling system of claim 8 wherein the network module is further operable to communicate the lamp order form through the network to a lamp order site.

* * * * *